(12) United States Patent
Ishida

(10) Patent No.: US 7,360,049 B2
(45) Date of Patent: Apr. 15, 2008

(54) NON-VOLATILE SEMICONDUCTOR MEMORY DEVICE HAVING A PASSWORD PROTECTION FUNCTION

(75) Inventor: Terufumi Ishida, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 196 days.

(21) Appl. No.: 11/409,358

(22) Filed: Apr. 20, 2006

(65) Prior Publication Data
US 2006/0242425 A1    Oct. 26, 2006

(30) Foreign Application Priority Data
Apr. 21, 2005    (JP)    ............................. 2005-123153

(51) Int. Cl.
*G06F 12/14*    (2006.01)
(52) U.S. Cl. .................. 711/164; 711/103; 711/152; 365/185.04; 365/195; 713/185
(58) Field of Classification Search ................ 711/103, 711/152, 163, 164; 713/182, 183, 184, 185; 365/185.04, 195
See application file for complete search history.

(56) References Cited

U.S. PATENT DOCUMENTS 5,206,938 A * 4/1993 Fujioka ...................... 711/200
6,320,787 B1 11/2001 Ikeda
6,731,536 B1 * 5/2004 McClain et al. ........ 365/185.04
2006/0090053 A1 * 4/2006 Boning ....................... 711/163

FOREIGN PATENT DOCUMENTS

JP    9-69067 A    3/1997

* cited by examiner

Primary Examiner—Jack Lane
(74) Attorney, Agent, or Firm—Morrison & Foerster LLP

(57) ABSTRACT

In a nonvolatile semiconductor memory device according to the present invention, a password protection function is enabled or disabled based on a first specified value M and a second state specified value P such that when both of the first specified value M and the second state specified value P are in a set state, the password protection function is enabled and when at least the second specified value P is in a reset state, the password protection function is disabled, and the first state specified value M maintains a previous state and the second state specified value P follows the state of the first state specified value M in response to a reset operation, and the cancel operation to shift the second state specified value P to the reset state can be performed only when the password is inputted correctly.

20 Claims, 9 Drawing Sheets

| Command Name | Usage | Remarks |
|---|---|---|
| Password Registering Command | Registering the verifying password. | When the number of bits of the password is great, the password is divided. |
| Password Protection Enabling Command | Enabling the password protection function. After this command is executed, data can not be read out without canceling the password protection function. | |
| Protection Cancel Command (Mode Bit Cancel Command) | Disabling perfectly the password protection function. After this command is executed, it is not necessary to input the password, including reset operations. | |
| Password Cancel Command | Canceling temporarily the password protection function. Only when the password is correctly inputted, the password protection function is temporarily cancelled, so that data can be read out. | When reset operations are executed, the protection state automatically returns to the password protection state. |
| Data Protection Flag Reset Command | Resetting the data protection flags in the set state. | Erasing all the data protection flags. |
| Block Erase Command | Erasing all data in a memory block. | |
| ReadID command | Reading ID code in the device. | |

Fig. 3

NON-VOLATILE SEMICONDUCTOR MEMORY DEVICE HAVING A PASSWORD PROTECTION FUNCTION

CROSS REFERENCE TO RELATED APPLICATION

This Nonprovisional application claims priority under 35 U.S.C. §119(a) on Patent Application No. 2005-123153 filed in Japan on Apr. 21, 2005, the entire contents of which are hereby incorporated by reference.

BACKGROUND OF THE INVENTION

1. Field of the Invention

The present invention relates to a nonvolatile semiconductor memory device having a security function and more particularly to a nonvolatile semiconductor memory device comprising at least one memory block comprising a plurality of nonvolatile memory cells, and having a password protection function by which data cannot be read out from a part of the memory block or the entire memory block without a cancel operation using a password.

2. Description of the Related Art

As the number of kinds of electronic devices using a nonvolatile semiconductor memory device is increased, usage of the nonvolatile semiconductor memory device such as a flash memory in which stored information is not erased even when a power supply used in the electronic device is turned off has been diversified.

For example, according to a mobile phone, as capacity of the nonvolatile semiconductor memory device becomes large, usage in which a system program is stored in a part of a memory region and data which can be read or written by a user such as application data or a telephone directory is stored in the other memory region has been increasingly employed. In addition, usage in which nonvolatile semiconductor memory devices comprising a plurality of chips in one package are laminated to be mounted is also increasingly employed.

Furthermore, according to a digital television or a liquid crystal television, an electronic programming guide is automatically and regularly inputted and updated program data is stored in an internal nonvolatile semiconductor memory device.

Furthermore, according to a communication device, a fax machine, a copying machine and the like are increasingly integrated, so that usage in which once copied data is stored in the nonvolatile semiconductor memory device so as not be erased by a trouble in communication or an unexpected power-off is also increasingly employed. Furthermore, a charged delivery service to provide video contents in satellite broadcast or a cable television and the like are prevailed, the nonvolatile semiconductor memory device is provided in a set-top box so as to be used in a system in which payment information or personal information is stored and only subscribers can receive the service.

Thus, according to the nonvolatile semiconductor memory device which is highly diversified in usage, there is developed a nonvolatile semiconductor memory device comprising a security function against a case where data is leaked by reading out the written data from outside and using it illegally or the service is illegally used.

The security function is to prevent data stored in the nonvolatile semiconductor memory device from being read illegally by a malicious user or third person. For example, a vendor of the memory device or a manufacturer of application of the memory device separately sets a region in which a verifying password is stored in a memory region of a nonvolatile semiconductor memory device, and the verifying password is set prior to writing of internal data before or after shipment. Thus, a password is inputted from outside before the internal data is read and when the password does not coincide with the verifying data stored in the memory device, the stored data cannot be outputted or erroneous data is outputted. Such security function is disclosed in Japanese Unexamined Patent Publication No. 2001-5729 (patent document 1) and Japanese Unexamined Patent Publication No. 9-69067 (patent document 2), for example.

According to a security function disclosed in the patent document 1, a function to prevent a password itself from being illegally read out is added to a fundamental function to protect data from being read out using the password. More specifically, according to the security function disclosed in the patent document 1, a password region in which a password is stored is previously provided in a memory region and the password region can be accessed only when it is accessed by a specific address except for a previously provided trap address instead of the password. However, this trap address places a burden on the system side additionally. For example, since the trap address is provided, when a normal serial address space is sequentially read out, it is necessary to avoid the trap address, which increases the burden on the system side. Furthermore, according to a constitution in which data is erased in order to protect the data such as the password stored in the password region, when the password region is not appropriately accessed, the data could be lost improperly, and address management on the system side becomes complicated.

According to a security function disclosed in the patent document 2, although a fundamental function to protect data using a password from being illegally read out, and setting and verifying operations for the password are disclosed, it is not disclosed in detail that which part of a memory region is how protected. According to usage of a nonvolatile semiconductor memory device in an electronic device, there is a case where a boot-block region accessed by the CPU first is to be excluded from the password protection even in a memory region in the same chip. However, according to the security function disclosed in the patent document 2, a system is not designed to correspond to such selective operation. In addition, after the protection state with the password is cancelled once, when a forced reset by turning off a power supply or a hardware reset by a command input is generated, it is not clear how effectiveness of the password is maintained afterwards. For example, when the password is canceled once, it is necessary to clarify whether the password cancel state is maintained after the reset, or the password cancel state is also reset to the password protection state after the reset.

SUMMARY OF THE INVENTION

The present invention was made in view of the above problem and it is an object of the present invention to provide a nonvolatile semiconductor memory device having a password protection function in which data cannot be read out without a cancel operation using a password, in which the password protection function is ensured after a predetermined operation such as a reset operation and great flexibility is provided for the password protection function.

In order to attain the above object, as a first characteristics, a nonvolatile semiconductor memory device according to the present invention comprises at least one memory block made of a plurality of nonvolatile memory cells and has a password protection function in which data cannot be read out from a part of the memory block or the entire memory block without a cancel operation using a password, wherein the password protection function is enabled or disabled based on a first and second state specified values such that when both of the first and second state specified values are in a set state, the password protection function is enabled and when at least the second specified value is in a reset state, the password protection function is disabled, and the first state specified value maintains a previous state and the second state specified value follows the state of the first state specified value in response to a predetermined operation of the nonvolatile semiconductor memory device, and the cancel operation to shift the second state specified value to the reset state can be performed only when the password is inputted correctly.

According to the nonvolatile semiconductor memory device having the above characteristics, the predetermined operation is preferably a reset operation at the time of turning on a power supply or inputting a reset signal.

Further preferably, according to the nonvolatile semiconductor memory device having the above characteristics, when the first state specified value is changed from a reset state to the set state, the second state specified value is changed to the set state following the first state specified value.

Further preferably, the nonvolatile semiconductor memory device having the above characteristics comprises a nonvolatile first state specified value memory circuit in which the first state specified value is stored, and a volatile second state specified value memory circuit in which the second state specified value is stored.

Further preferably, the nonvolatile semiconductor memory device having the above characteristics comprises a nonvolatile password memory circuit in which a verifying password for the password is previously stored, and a volatile password register in which the verifying password transferred from the password memory circuit is stored after the power supply is turned on.

Further preferably, according to the nonvolatile semiconductor memory device having the above characteristics, the state specified by the first state specified value and the second state specified value comprises a password protection state in which both of the first state specified value and the second state specified value are in the set state so that the password protection function is enabled, a password cancel state in which the first state specified value is in the set state and the second state specified value is in the reset state, and a normal state when both of the first state specified value and the second state specified value are in the reset state, and those states can be shifted from the normal state to the password protection state, from the password protection state to the password cancel state, and from the password cancel state to the password protection state or the normal state.

Further preferably, according to the nonvolatile semiconductor memory device having the above characteristics, the normal state is set as an initial state before shipment.

Further preferably, according to the nonvolatile semiconductor memory device having the above characteristics, in the normal state, when a predetermined password protection enabling command for shifting the normal state to the password protection state is inputted, both of the first state specified value and second state specified value are changed from the reset state to the set state.

Further preferably, according to the nonvolatile semiconductor memory device having the above characteristics, in the normal state, when a command other than the password protection enabling command is inputted, or when a power supply reset occurs or a reset signal is inputted, the normal state is maintained.

Further preferably, according to the nonvolatile semiconductor memory device having the above characteristics, in the password protection state, when a predetermined password cancel command for shifting the password protection state to the password cancel state is inputted, the second state specified value is reset from the set state to the reset state.

In this case, it is preferable that the password cancel command comprises a plurality of bits and contains the password therein. Further preferably, when the password cancel command is inputted in the password protection state and the password contained in the password cancel command coincides with the predetermined verifying password, the second state specified value is reset from the set state to the reset state and the state is shifted to the password cancel state, and when it does not coincide with the predetermined verifying password, the second state specified value is not reset from the set state to the reset state and the password protection state is maintained.

Further preferably, according to the nonvolatile semiconductor memory device having the above characteristics, when the command other than the password cancel command is inputted in the password protection state, or when the power supply reset or the reset signal is inputted, the second state specified value is not reset from the set state to the reset state, so that the password protection state is maintained.

Further preferably, according to the nonvolatile semiconductor memory device having the above characteristics, when the predetermined protection cancel command for shifting the password cancel state to the normal state is inputted, the first state specified value is set from the reset state to the set state.

Further preferably, according to the nonvolatile semiconductor memory device having the above characteristics, when the power supply reset occurs or the reset signal is inputted in the password cancel state, the second state specified value is set from the reset state to the set state and the state is shifted to the password protection state.

In addition to the above characteristics, as a second characteristics, a nonvolatile semiconductor memory device according to the present invention comprises a first nonvolatile flag memory circuit in which a data protection flag for inhibiting writing and erasing to and from the memory block in units of the memory block is stored and a second nonvolatile flag memory circuit in which a permanent data protection flag for permanently inhibiting writing and erasing to and from the memory block in units of the memory block is stored, wherein data stored in the memory block for which the permanent data protection flag is set is permanently protected from writing and erasing and can be read out regardless of the state of the data protection flag.

In this case, it is preferable that when the password protection function is enabled, data can be read out from only the memory block for which the permanent data protection flag is set. Furthermore, it is preferable that a setting operation of the permanent data protection flag can be only performed when at least the second state specified value is in the reset state. Furthermore, it is preferable that the permanent data protection flag is set for one memory bock selected as a boot-block in the memory blocks.

According to the nonvolatile semiconductor memory device having the above characteristics, since when both of the first state specified value and the second state specified value are in the set state, the password protection function is enabled and when at least the second state specified value is in the reset state, the password protection function is disabled and only when the password is correctly inputted, the cancel operation to set the second state specified value to the reset state can be performed, the password protection function in which data cannot be read out without the cancel operation using the password can be concretely implemented. In addition, since the password protection function can be enabled or disabled using the first state specified value and the second state specified value according to the states (the set state and the reset state) of the first state specified value and the second state specified value, when the second state specified value is in the reset state and the password protection function is disabled, the state can be varied according to the first state specified value. As a result, high flexibility can be implemented in the password protection function.

Furthermore, since the first state specified value maintains the previous state and the second state specified value follows the first state specified value in response to the predetermined operation of the nonvolatile semiconductor memory device, after the predetermined operation, when the state of the first state specified value before the predetermined operation is in the set state, both of the first state specified value and the second state specified value are set to the set state, and when the state of the first state specified value before the predetermined operation is in the reset state, both of the first state specified value and the second state specified value are set to the reset state. As a result, after the predetermined operation, the password protection function can be enabled or disabled according to the previous state of the first state specified value regardless of the second state specified value, that is, regardless of whether it is enabled or not before the predetermined operation.

For example, in a case where the predetermined operation is a reset operation when the power supply is turned on or a reset signal is inputted, when the first state specified value is in the set state before the reset operation, even if the password protection function is disabled, the password protection function can be enabled by the reset operation. As a result, the disabled state of the password protection function can be prevented from being improperly maintained after the reset operation, so that the data can be totally protected. Furthermore, when the first state specified value is in the reset state, since both of the first state specified value and the second state specified value are set to the reset state by the predetermined reset operation, even when the reset operation is repeated, the disabled state of the password protection function is not changed. As a result, the nonvolatile semiconductor memory device can be used in the same manner as the normal one having no password protection function. Therefore, it can be selected whether the nonvolatile semiconductor memory device is used as the normal one, or it is used as the one comprising the password protection function by using the state of the first state specified value, and when it is used as the nonvolatile semiconductor memory device having the password protection function, the password protection function can be enabled or disabled according to the state of the second state specified value.

Furthermore, according to the nonvolatile semiconductor memory device having the above second characteristics, since the data in the memory block in which the permanent data protection flag is set can be permanently protected from writing and erasing and can be read even when the password protection function is enabled, the memory block in which the permanent data protection flag is set can be selectively separated from the password protection function. Thus, when the nonvolatile semiconductor memory device having the second characteristics is applied to a system using the conventional nonvolatile semiconductor memory device having the permanent data protection function, the password protection function can be forcedly canceled in a certain memory block without adding a special function or circuit to the system side. Especially, in a case where the nonvolatile semiconductor memory device comprises the plurality of memory blocks, when the permanent data protection flag is set in a specific memory block and the memory block is selected as the boot-block used for a program loading access at the time of booting of the CPU, the data of the boot-block can be read out without the password. In addition, since a substantial function in which the data of the boot-block is permanently protected from writing and erasing can be implemented at the same time, there can be provided a high efficient circuit constitution.

BRIEF DESCRIPTION OF THE DRAWINGS

FIG. 3 is a command list showing an example of commands used in the nonvolatile semiconductor memory device according to one embodiment of the present invention;

DETAILED DESCRIPTION OF THE INVENTION

An embodiment of a nonvolatile semiconductor memory device according to the present invention (referred to as the "memory device of the present invention" hereinafter) will be described with reference to the drawings hereinafter.

Figure 1:
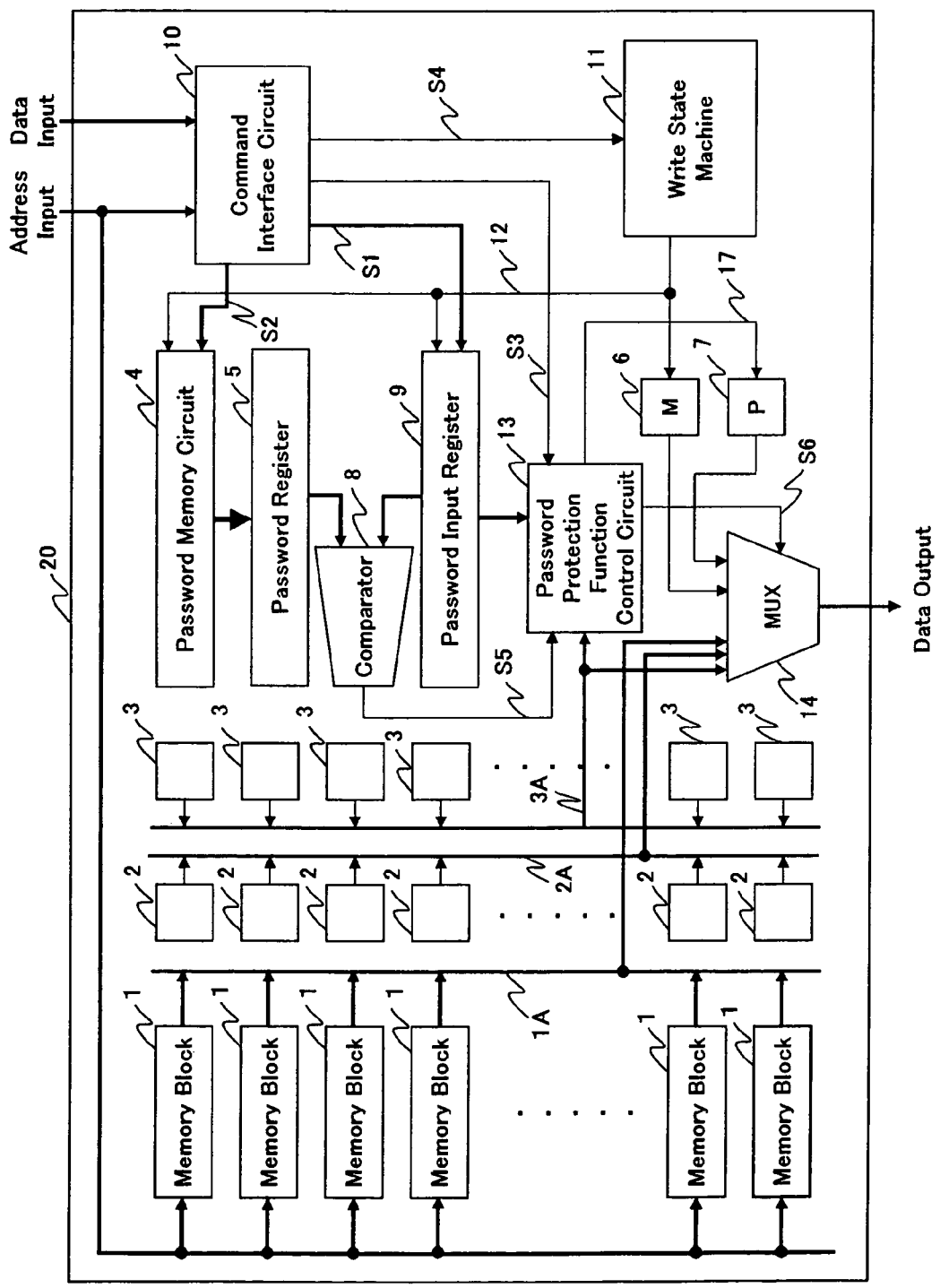
FIG. 1 is a block diagram schematically showing a constitution of a nonvolatile semiconductor memory device according to one embodiment of the present invention.

FIG. 1 shows a schematic constitution of a memory device 20 of the present invention. As shown in FIG. 1, the memory device 20 of the present invention comprises a plurality of memory blocks 1, a plurality of first flag memory circuits 2, a plurality of second flag memory circuits 3, a password memory circuit 4, a password register 5, a mode bit memory circuit 6, a protection bit memory circuit 7, a comparator 8, a password input register 9, a command interface circuit 10, a write state machine 11, a password protection function control circuit 13, and a multiplexer (MUX) 14.

The memory block 1 comprises a plurality of nonvolatile memory cells arranged in matrixes of rows and columns, and it is a minimum unit in which batch erase of the nonvolatile memory cells can be performed, so that batch erase of data stored in the memory cells can be performed in each memory block. According to this embodiment, the nonvolatile memory cell assumes a nonvolatile memory cell such as a flash memory cell in which data is written or erased electrically, and batch erase of the data can be performed by the memory block. According to the schematic constitution of the memory device 20 of the present invention shown in FIG. 1, circuits that a conventional nonvolatile semiconductor memory device comprises in general regarding a memory operation such as reading, writing, or erasing such as an address decoder, a readout circuit, and a write/erase circuit are omitted.

The first flag memory circuit 2 is a nonvolatile memory circuit which stores a data protection flag (which is called a "block lock bit" in a general flash memory in some cases) for inhibiting writing and erasing in each memory block 1. The second flag memory circuit 3 is a nonvolatile memory circuit which stores a permanent data protection flag (which is called "permanent lock bit" in the general flash memory in some cases) for inhibiting writing and erasing permanently in each memory block 1. Each of the data protection flag and the permanent data protection flag for each memory block is processed as internal data comprising at least one bit. A data output of the memory block 1, an output of the data protection flag of the first flag memory circuit 2, and an output of the permanent data protection flag of the second flag memory circuit 3 are inputted to the multiplexer (MUX) 14 through a data bus 1A, a first flag data bus 2A and a second flag data bus 3A, respectively.

In addition, according to this the present invention, the permanent data protection flag of the second flag memory circuit 3 can be set to a set state when the data protection flag of the corresponding first flag memory circuit 2 is in a set state. Once the permanent data protection flag becomes the set state, the data protection flag in the corresponding first flag cannot be written and erased, and the data protection flag in the set state is set to the set state permanently. Since the data protection flag of the corresponding first flag memory circuit 2 when the permanent data protection flag is in a reset state can be written and erased, the write protection state can be canceled even in the memory block set to the write protection state once.

Furthermore, the memory device 20 of the present invention has a password protection function to inhibit a part of the plurality of memory blocks 1 or the entire blocks from being read out without a cancel operation using a password. The password memory circuit 4, the password register 5, the mode bit memory circuit 6, the protection bit memory circuit 7, the comparator 8, the password input register 9 and the password protection function control circuit 13 are provided to implement the password protection function.

The password memory circuit 4 is a nonvolatile memory circuit comprising a plurality of memory bits to store a verifying password of the password in advance. In addition, the password register 5 is a volatile register circuit to read and store contents stored in the password memory circuit 4 just after a power is turned on or the verifying password is set.

The mode bit memory circuit 6 is a nonvolatile memory circuit to store a mode bit M (corresponding to a first state specified value) of two state specified values to be used for enabling or disabling the password protection function, which corresponds to a first state specified value memory circuit. The protection bit memory circuit 7 is a volatile memory device to store a protection bit P (corresponding to a second state specified value) of the two state specified values, which corresponds to a second state specified value memory circuit. The mode bit M and the protection bit P each comprise at least one bit (one bit in this embodiment). Since the mode bit memory circuit 6 is the nonvolatile memory device, a value of the mode bit M stored therein is not varied according to power supply reset when the memory device 20 of the present invention turns on the power supply or hardware reset when a reset signal is inputted (comprising a reset command input) and a previous value is maintained. Meanwhile, since the protection bit memory circuit 7 is the volatile memory device, a value of the protection bit P is varied according to the power supply reset or the hardware reset and a previous value is not maintained. Thus, according to this embodiment, it is designed such that the protection bit P stored in the protection bit memory circuit 7 is forcedly conformed to the mode bit M stored in the mode bit memory circuit 6 after the power supply reset or the hardware reset. Furthermore, when the mode bit M is set from the reset state to the set state also, the protection bit memory circuit 7 is operated such that the protection bit P is conformed to the mode bit M. In addition, outputs of the mode bit memory circuit 6 and the protection bit memory circuit 7 are inputted to the multiplexer 14 and the password protection function control circuit 13 through an output signal lines 6A and 7A, respectively.

Figure 2:
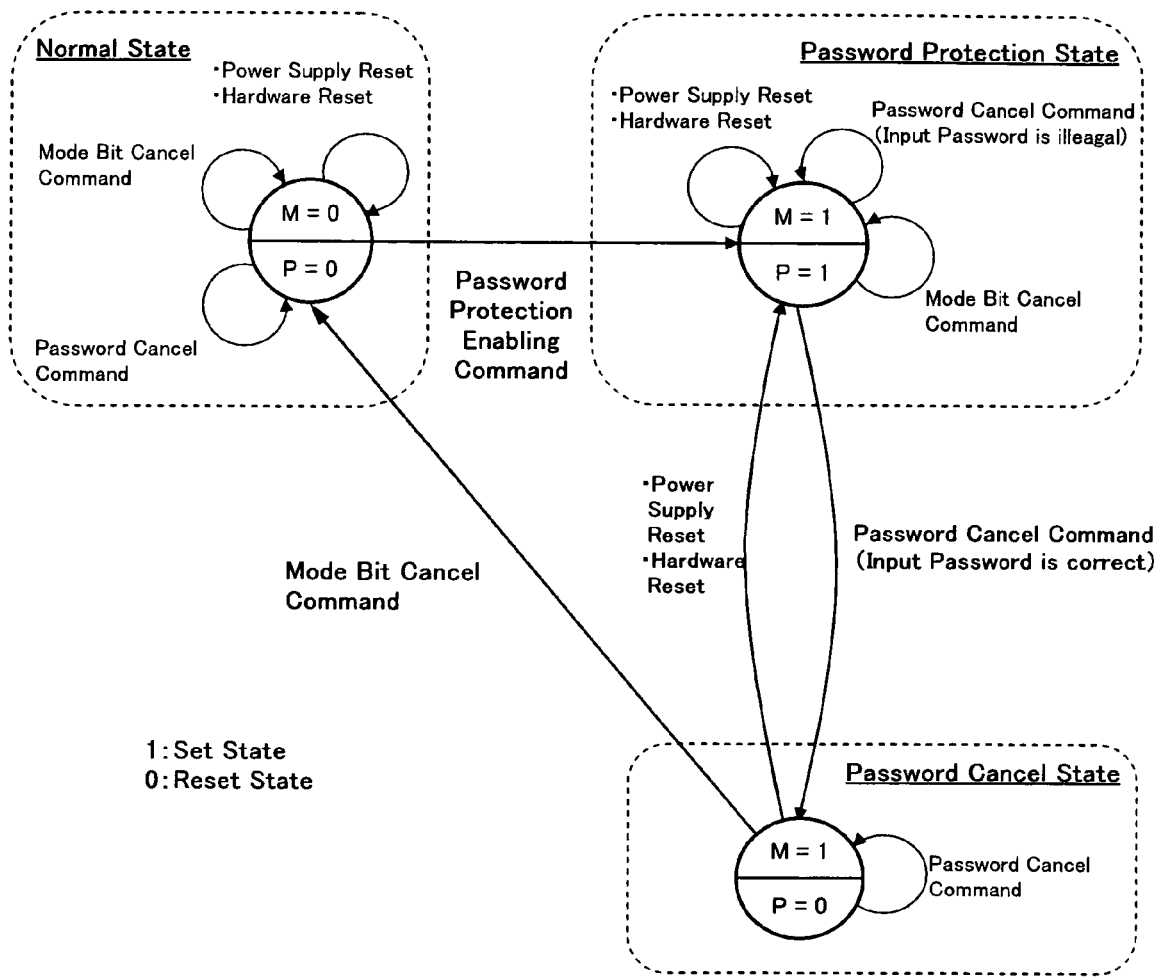
FIG. 2 is a view showing three protection states to be shifted in a password protection function of the nonvolatile semiconductor memory device according to the present invention.

According to the password protection function of the memory device 20 of the present invention, state specified by the mode bit M and the protection bit P includes three protection states such as a password protection state in which the password protection function is enabled when both of the mode bit M and protection bit P are in set state, a password cancel state when the mode bit M is in the set state and the protection bit P is in the reset state, and a normal state when both of the mode bit M and protection bit P are in the reset state as shown in a state transition view in FIG. 2. In the password cancel state and the normal state, the password protection function is disabled and the data of the memory block 1 can be read out. The password protection function can be shifted from the normal state to the password protection state, from the password protection state to the password cancel state, and from the password cancel state to the password protection state or the normal state. In order to shift the function from the password protection state to the password cancel state, a password cancel command and a password are to be inputted from the outside. The normal state is different from the password cancel state in whether the state of the mode bit M is in the reset state or in the set state. After the power supply reset or the hardware reset, the normal state maintains the normal state while the password cancel state is shifted to the password protection state. Thus, while the normal state is a perfectly canceled from the password protection state, the password cancel state is a temporally canceled from the password protection state.

Since the memory device 20 of the present invention receives a command specific to the memory device 20 of the present invention to shift the state of the password protection function in addition to the command employed in the general flash memory, the command interface 10 analyzes the command contents by decoding each command inputted through a data input terminal and an address input terminal. Here, an example of commands used in the memory device 20 of the present invention is shown in a command table in FIG. 3.

According to this embodiment, the password required for the password cancel is contained in the password cancel command and inputted together. When the password cancel command is inputted, the command interface 10 decodes the command, extracts the password contained in the password cancel command, outputs it to the password input register 9 as a password input signal S1, and the password input signal S1 is temporally stored in the password input register 9.

The comparator 8 compares the password inputted to the password input register 9 with the verifying password stored in the password register 5, and determines whether they are matched or not. The result of verifying by the comparator 8 is outputted to the password protection function control circuit 13 as a verified result signal S5.

In addition, other than the password input signal S1, a control signal group S4 generated by decoding the command, a password control signal S2, and a password cancel control signal S3 are outputted from the command interface 10. The control signal group S4 is outputted to the write state machine 11 to control an erase operation or a write operation. The password control signal S2 is outputted to the password memory circuit 4, and the password cancel control signal S3 is outputted to the password protection function control circuit 13.

The write state machine 11 controls processing steps of the write operation and the erase operation in the memory block 1 of the memory device 20 of the present invention. According to this embodiment, the writing operation and erasing operation of the nonvolatile memory circuit and the volatile memory circuit other than the memory block 1 are also controlled. For example, the write state machine 11 outputs data to the password memory circuit 4 and to the password input resister 9 and the like through a memory data bus 12.

The password protection function control circuit 13 controls the shift among the three protection states corresponding to the mode bit M and the protection bit P stored in the mode bit memory circuit 6 and the protection bit memory circuit 7, respectively, and controls the output to the multiplexer 14 according to each protection state. More specifically, the password protection function control circuit 13 performs a reset operation of the protection bit memory circuit 7 with the password cancel control signal S3. In addition, the password protection function control circuit 13 determines and selects the data to be outputted, from the data inputted to the multiplexer 14 with a data selection control signal S6 depending on the protection state.

An operation of each part of the memory device 20 of the present invention will be described hereinafter. First, when the memory device 20 of the present invention is in a default state in which any particular setting is not performed yet, for example, in a state before shipment, data in the memory block 1 is in an erase state, and similarly, the first flag memory circuit 2, the second flag memory circuit 3, the password memory circuit 4 and the nonvolatile memory circuit of the mode bit memory circuit 6 are all in the erase state. In addition, the password register 5 and the protection bit memory circuit 7 which are the volatile memory circuits are in a reset state. Thus, both of the mode bit M and the protection bit P are in the reset state and the protection state is the normal state.

According to the conventional nonvolatile memory, when data is written in the memory block 1 and the data is to be protected from writing or erasing in the normal state, the data protection flag or the permanent data protection flag stored in the first flag memory circuit 2 or the second flag memory circuit 3 of the memory block to be protected is set to the set state to prevent writing or erasing in the memory block.

According to the memory device 20 of the present invention, in addition to the conventional protection from writing or erasing, there is provided a password protection function in which the data cannot be read out without a cancel operation using a password from a part of the plurality of memory blocks 1 or the all memory blocks. In this password protection function, the password has to be registered by a command. When a password registering command is outputted from an external system to the memory device 20 of the present invention, the command interface 10 decodes the inputted command and recognizes that the password registering command has been inputted. Then, the command interface 10 instructs the write state machine 11 to start to register the password with the control signal group S4. The write state machine 11 writes the verifying password into the password memory circuit 4 to control registering the password through the memory data bus 12. When the password is registered in the password memory circuit 4, the verifying password is automatically transferred to the password register 5 at the same time.

Furthermore, in order to set the password protection state in the memory device 20 of the present invention, it is necessary to perform a writing operation in the mode bit memory circuit 6 to set the mode bit M to the set state as will be described in detail below. In order to perform the writing operation in the mode bit memory circuit 6, a password protection enabling command is inputted from the external system to the command interface 10. The command interface 10 decodes the command and instructs the write state machine 11 to control writing in the mode bit memory circuit 6 with the control signal group S4. The write state machine 11 receives the instruction to start writing in the mode bit memory circuit 6 with the control signal group S4 and performs writing operation in the mode bit memory circuit 6 through the memory data bus 12. When the writing operation in the mode bit memory circuit 6 is completed, the mode bit M in the set state is automatically copied in the protection bit memory circuit 7, and the protection bit P in the protection bit memory circuit 7 is set to the set state. The outputs of the mode bit memory circuit 6 and the protection bit memory circuit 7 are inputted to the multiplexer 14 and they can be read out from the multiplexer 14. More specifically, when a ReadID command is inputted to the command interface 10, the multiplexer 14 selects and outputs the mode bit M and the protection bit P as a part of the outputs. As a result, it can be determined whether the protection state of the memory device 20 of the present invention is the password protection state or the password cancel state or the normal state.

After the writing operation in the mode bit memory circuit 6 is completed, both of the mode bit M and the protection bit P become the set state, and the state of the memory device 20 of the present invention is automatically shifted to the password protection state in which the password protection function is enabled. In the password protection state, the data cannot be read out from the memory block 1 in which the second flag memory circuit 3 is not previously set to the set state. Namely, the multiplexer 14 does not select the output data from the memory block 1 on the data bus 1A but selects totally other data as data output by the output control of the data selection control signal S6 from the password protection function control circuit 13.

In addition, the ReadID command is a command for reading the inner state of the memory device 20 of the present invention and it is used when a device ID of the memory device 20 and the states of the data protection flag and the permanent data protection flag of the first flag memory circuit 2 and the second flag memory circuit 3, respectively are read out. Therefore, when the first flag data bus 2A and the second flag data bus 3A are connected to the multiplexer 14 and the ReadID command is outputted to the memory device 20 of the present invention, the states of the data protection flag and the permanent data protection flag can be outputted through the multiplexer 14, so that it can be recognized which of the memory blocks is in the temporal write protection state or the permanent write protection state by the external system. In this case, an address of the memory block of the data protection flag and the permanent data protection flag to be read out is inputted as an address.

As described above, after the writing in the mode bit memory circuit 6, correct data cannot read out from the memory block 1 in which the permanent data protection flag of the second flag memory circuit 3 is not in the set state without canceling the password protection state using the password. Therefore, the user has to input the same password as the previously registered verifying password to the memory device 20 of the present invention using the password cancel command in order to read the data from the memory block 1 in which the permanent data protection flag is in the reset state. When the password cancel command is executed, the password is extracted by the decoding process in the command interface 10. The extracted input password is inputted to the password input register 9 as the password input signal S1. Then, the verifying password stored in the password register 5 is compared with the inputted password in the password input register 9 by the comparator 8. When the inputted password coincides with the verifying password, the password protection function control circuit 13 recognizes cancel of the password protection state with the verified result signal S5 from the comparator 8 and instructs the multiplexer 14 to select and output the output data of the data bus 1A. Thus, the data in the memory block 1 can be read out. Meanwhile, when the inputted password does not coincide with the verifying password, the password protection state cannot be canceled and the protection state of the memory device 20 of the present invention is kept in the password protection state and the data of the memory block 1 cannot be read out.

Next, a description will be made of the shifting among the three protection states of the normal state, the password protection state and the password cancel state in the memory device 20 of the present invention in detail with reference to FIG. 2.

As described above, the three protection states include the password protection state in which the password protection function is enabled, the password cancel state in which the password protection function is temporally canceled, and the normal state in which the password protection function is perfectly canceled. According to the password cancel state, since the password protection function is temporally cancelled and it automatically returns to the password protection state after the power supply reset or the hardware reset, it is regarded as a quasi-password protection state, that is, as a part of the password protection function in the memory device 20 of the present invention.

In the normal state, the mode bit M is in the reset state and the protection bit P is also in the reset state. In the normal state, desirable data can be read from the memory block 1 only by inputting an address to be read from outside. For example, the protection state before shipment is the normal state, and the user uses the memory device 20 of the present invention from the normal state. In the normal state, even when a password cancel command, a mode bit cancel command (corresponding to the protection cancel command) and the like other than the password protection enabling command are executed, the protection state is not changed and kept in the normal state. Furthermore, in the normal state, even when the power supply reset or the hardware reset is generated, the normal state is maintained.

In the normal state, the protection state of the memory device 20 of the present invention cannot be changed by just writing the verifying password in the password memory circuit 4 to register it. Namely, only registering the verifying password in the password memory circuit 4 cannot enable the password protection function of the memory device 20 of the present invention.

In the normal state, when a certain verifying password is written in the password memory circuit 4, the verifying password written in the password memory circuit 4 is automatically transferred to the volatile password register 5 and stored therein. This transfer operation from the password memory circuit 4 to the password register 5 is executed also by the power supply reset or the hardware reset, and the data of the password memory circuit 4 (verifying password) is stored in the password register 5, which is all the same in any protection state of the memory device 20 of the present invention.

When the password protection enabling command is inputted to the command interface 10 of the memory device 20 of the present invention in the normal state, the command interface 10 decodes the command and recognizes that the normal state is shifted to the password protection state and instructs the write state machine 11 to write it in the mode bit memory circuit 6. Then, when the password protection function control circuit 13 recognizes that the writing operation is performed in the mode bit memory circuit 6, so that the mode bit M is changed to the set state and then the protection bit P is set to the set state, the normal state is shifted to the password protection state. Since this is not two-way shift but one-way shift, the password protection state cannot be shifted directly to the normal state.

After the states is shifted from the normal state to the password protection state, when the protection bit P is set to the reset state by the password cancel command, the password protection state is shifted to the password cancel state in the memory device 20 of the present invention. Here, the password cancel operation to shift the state from the password protection state to the password cancel state is performed only when the password externally inputted by the password cancel command and stored in the password input register 9 is compared with the verifying password registered in the password memory circuit 4 previously by the comparator 8 and those are matched in all bits. The password protection function control circuit 13 resets the protection bit P of the protection bit memory circuit 7 to the reset state while it maintains the set state of the mode bit M of the mode bit memory circuit 6 by the password cancel operation using the result showing that all bits are matched and the password cancel control signal S3 from the command interface 10.

After the state is shifted to the password cancel state, the password cancel state automatically returns to the password protection state by the reset operation such as the power supply reset by turning on the power supply after shut off or the hardware reset by inputting an reset input signal or a reset command from the reset terminal of the memory device 20 of the present invention. More specifically, since the mode bit M in the nonvolatile mode bit memory circuit 6 is kept in the set state regardless of the reset operation, when the data (mode bit M in the set state) in the mode bit memory circuit 6 is transferred to the volatile protection bit memory circuit 7 by the reset operation, the protection bit P is conformed to the mode bit M. As a result, both of the mode bit M and protection bit P are set to the set state, so that the state returns to the password protection state.

When the state becomes the password protection state, since the password protection function of the memory device 20 of the present invention is enabled, the data of the memory block 1 cannot be read out without shifting the protection state to the password cancel state by inputting the password cancel command containing the password again.

In addition, data can be read from the memory block 1 in which the permanent data protection flag of the second flag memory circuit 3 is set to the set state to inhibit writing and erasing permanently, even in the password protection state. However, the permanent data protection flag is inhibited from being set to the set state in the password protection state, and it can be set after the state is shifted to the password cancel state or the normal state. The reason comes from the fact that the command for setting the permanent data protection flag to the set state has been conventionally open to the public and if a person other than the user who can input the password to shift the state from the password protection state to the password cancel state, a hacker, for example can set the permanent data protection flag to the set state without shifting the state to the password cancel state with the password under such circumstances, the hacker can set the permanent protection flags of all of the memory blocks 1 to the set state and read the data of all memory blocks 1.

More specifically, the following case can be considered. That is, a qualified user resisters the verifying password and sets the mode bit M in the set state in order to enable the password protection function first. Then, in order to permanently protect the memory block allotted to a memory space of a nonvolatile semiconductor memory device accessed by the CPU for the first time when the power is turned on so that data cannot be written therein, the user sets the permanent data protection flag of the memory block to the set state in view of mounting it on a system. Thus, the data from the memory block in which the permanent data protection flag is set can be read without the cancel operation with the password. The nonvolatile semiconductor memory device after the permanent protection flag is set is mounted on the system and shipped.

Meanwhile, when a malicious person, hacker, for example dismounts the nonvolatile semiconductor memory device from the system and sets the permanent protection flags in all memory blocks to the set state in the nonvolatile semiconductor memory device in order to illegally read the data from each memory block, the password protection function of all memory blocks is cancelled and the data is illegally read out.

Although such problem is caused by the fact that the command for setting the permanent protection flag is open to the public, since the command has to be open to the public, the above illegal reading of the data is to be prevented so that the above security hole is prevented from being generated by requiring the password input in setting the permanent data protection flag, that is, requiring the shift to the password cancel state once.

Figure 4:
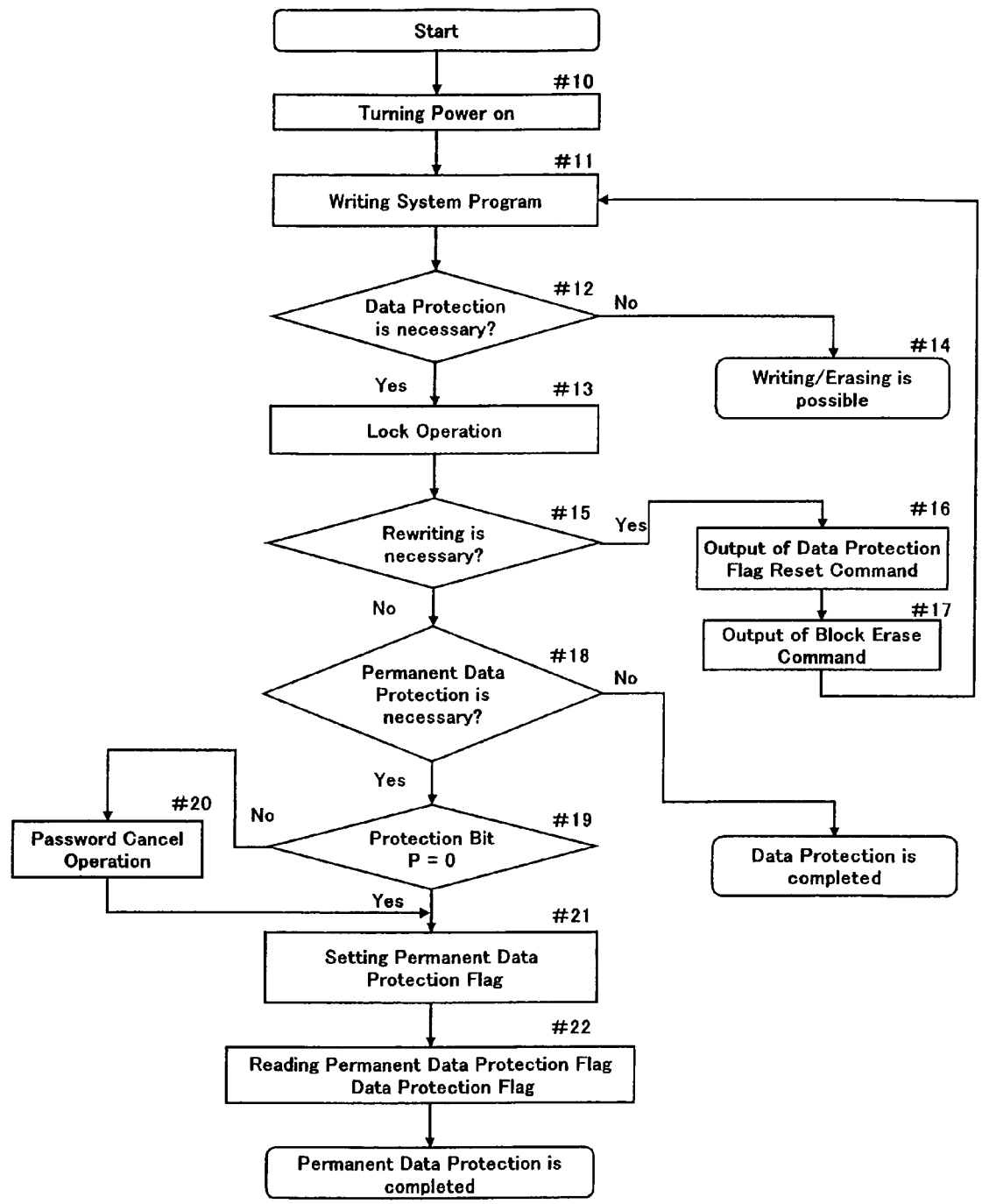
FIG. 4 is a flowchart showing a control operation of data protection from writing and erasing in the nonvolatile semiconductor memory device according to one embodiment of the present invention.

Next, a description will be made of control of data protection from writing and erasing in the memory block using the data protection flag and the permanent data protection flag with reference to a flowchart shown in FIG. 4. Referring to FIG. 4, a power is turned on at step #10 and a qualified user of the memory device 20 of the present invention writes a system program in a certain memory block 1 in general at step #11. Here, when it is previously set such that the memory block accessed by the system program first is defined as a boot-block previously, the user writes the system program in the boot-block.

Then, it is determined whether the boot-block in which the system program is written is to be set to inhibit writing and erasing or not in order to prevent erroneous writing and erroneous erasing at step #12. Here, when the erroneous writing and the erroneous erasing are to be prevented (YES), the data protection flag is set to the set state to prevent write and erase in the boot-block at step #13. The process of this step is referred to as the "lock operation" occasionally hereinafter.

When rewrite necessity is more emphasized on than risk avoidance from the erroneous write or the erroneous erase (NO) at the step #12, since the lock operation is not performed for the boot-block, it is not necessary to execute the command for setting the data protection flag to the set state and write and erase can be still performed in the boot-block at step #14.

After the data protection flag is set to the set state at the step #13, when it is determined that there is a need to rewrite (YES at step #15), a data protection flag reset command for resetting the data protection flag is outputted to reset the data protection flag to the reset state at step #16. When the data protection flag reset command is inputted, the data protection flags of all of the memory blocks in which the lock operations were performed so far are reset, rewriting (erasing and writing) can be performed in the memory block to which the rewriting is to be performed. At the time of the rewriting, a block erase command is outputted to the corresponding memory block at step #17 and the operation returns to the step #11 to write the data.

After the data protection flag is set to the set state at the step #13, when there is no need to rewrite (NO at step #15), it is determined whether the data protection state of the memory block is to be permanently maintained or not at step #18. When the data is to be permanently protected from writing and erasing (YES), it is necessary to set the permanent data protection flag to the set state. According to the memory device of the present invention, when the permanent data protection flag is set, the data of the memory block can be permanently protected from writing and erasing and when the password protection function is enabled afterwards, the data can be read without performing the password cancel operation.

As described above, in order to prevent the permanent data protection flag from being set by the illegal third person and the security hole from being generated, since the protection bit P has to be set in the reset state to set the permanent data protection flag in the memory device of the present invention, it is determined whether the protection bit P is in the reset state or not at step #19. When the protection bit P is not in the reset state (NO), the protection bit P is reset by the password cancel command at step #20, and the permanent protection flag is set at step #21. The permanent data protection flag can be set only after the steps #19 to #21 are performed.

Here, in order to monitor the set state of the permanent data protection flag or the data protection flag, the ReadID command to read internal information (device ID, data protection flag, permanent data protection flag, mode bit M, protection bit P and the like) of the memory device of the present invention is executed at step #22. When an address of the memory block to be monitored is inputted to the memory device of the present invention, the states of the data protection flag and the permanent data protection flag of the memory block can be outputted. In addition, according to output values of the data protection flag and the permanent data protection flag, "1" is outputted in the set state and "0" is outputted in the reset state. The above steps #10 to #12 are performed to protect the data of the memory block.

An effect provided by setting the permanent data protection flag in the memory device of the present invention will be described. When the password protection function is enabled, the password cancel operation has to be performed on the hardware in general. Thus, in order to reduce the load thereof, it is preferable that the permanent data protection flag is set in the memory block to be read when the CPU loads the system program just after the system is started, and the data of the memory block can be directly read out without the password cancel operation.

Figure 5:
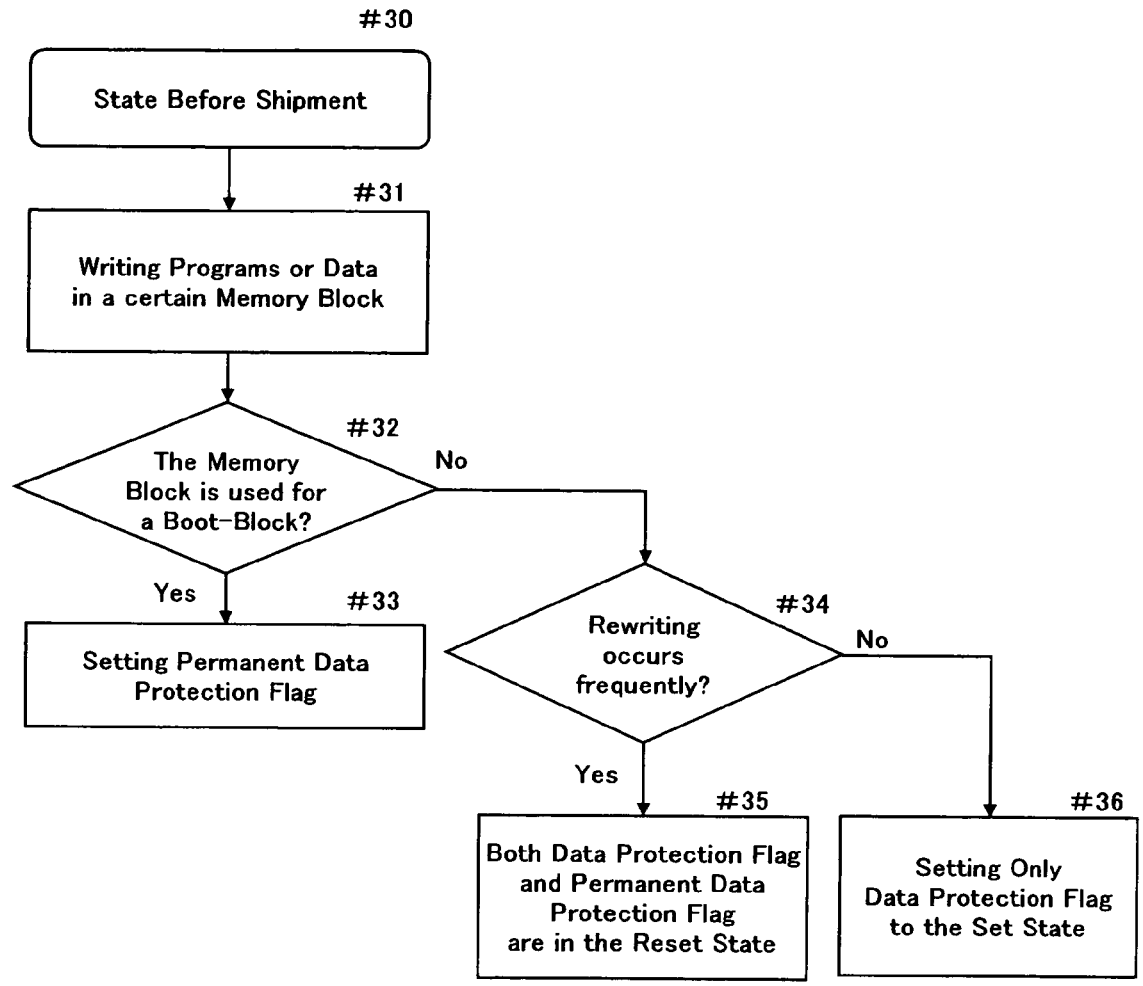
FIG. 5 is a flowchart showing a concrete example in which a permanent data protection flag and a data protection flag are used in the nonvolatile semiconductor memory device according to one embodiment of the present invention.

FIG. 5 shows an example in which the permanent data protection flag and the data protection flag are used. According to the example shown in FIG. 5, both of the permanent data protection flag and the data protection flag are in the reset state before shipment at step #30. In many cases, data or the system program is stored in a certain memory block in the memory device of the present invention after shipment at step #31. The user determines whether each memory block is used for the boot-block, or used for a data region in which data is often rewritten, or to be protected from erroneous writing or erroneous erasing, and the data protection flag and the permanent data protection flag are set according to its usage.

First, it is determined whether the memory block is to be used for the boot-block or not at step #32, and when it is (YES), the permanent data protection flag is set in the memory block at step #33. Thus, the data can be automatically protected from writing or erasing permanently. However, when the password protection function is enabled at this point, it is necessary to execute the password cancel operation according to the steps #19 to #21 shown in FIG. 4.

When the memory block is not used for the boot-block (NO) at the step #32, it is determined whether the data of the memory block is often rewritten or not at step #34, and when it is (YES), both of the permanent data protection flag and data protection flag are not set and they are still in the reset state at step #35. When the data in the memory block could be rewritten or it is to be protected although the data is not often rewritten (NO) at the step #34, only the data protection flag is set to the set state at step #36. When the data is rewritten after the data protection flag is set at the step #36, the data protection flag is to be reset once and then the data is rewritten.

When the permanent data protection flag is set to the set state, both permanent data protection from writing and erasing and data readout without the password cancel operation in the password protection state can be implemented in the memory block accessed by the CPU for the first time, so that it is a very ideal state for the boot-block region and such usage can be recommended for the user at the same time.

When the permanent data protection flag is not set, although the data protection state from writing and erasing can be maintained by the data protection flag, when an erasing operation is performed in the first flag memory circuit 2, all data protection flags can be reset to return the initial state.

As described above, the password protection function can be enabled or disabled depending on the usage by using both of the permanent data protection flag and data protection flag.

Figure 6:
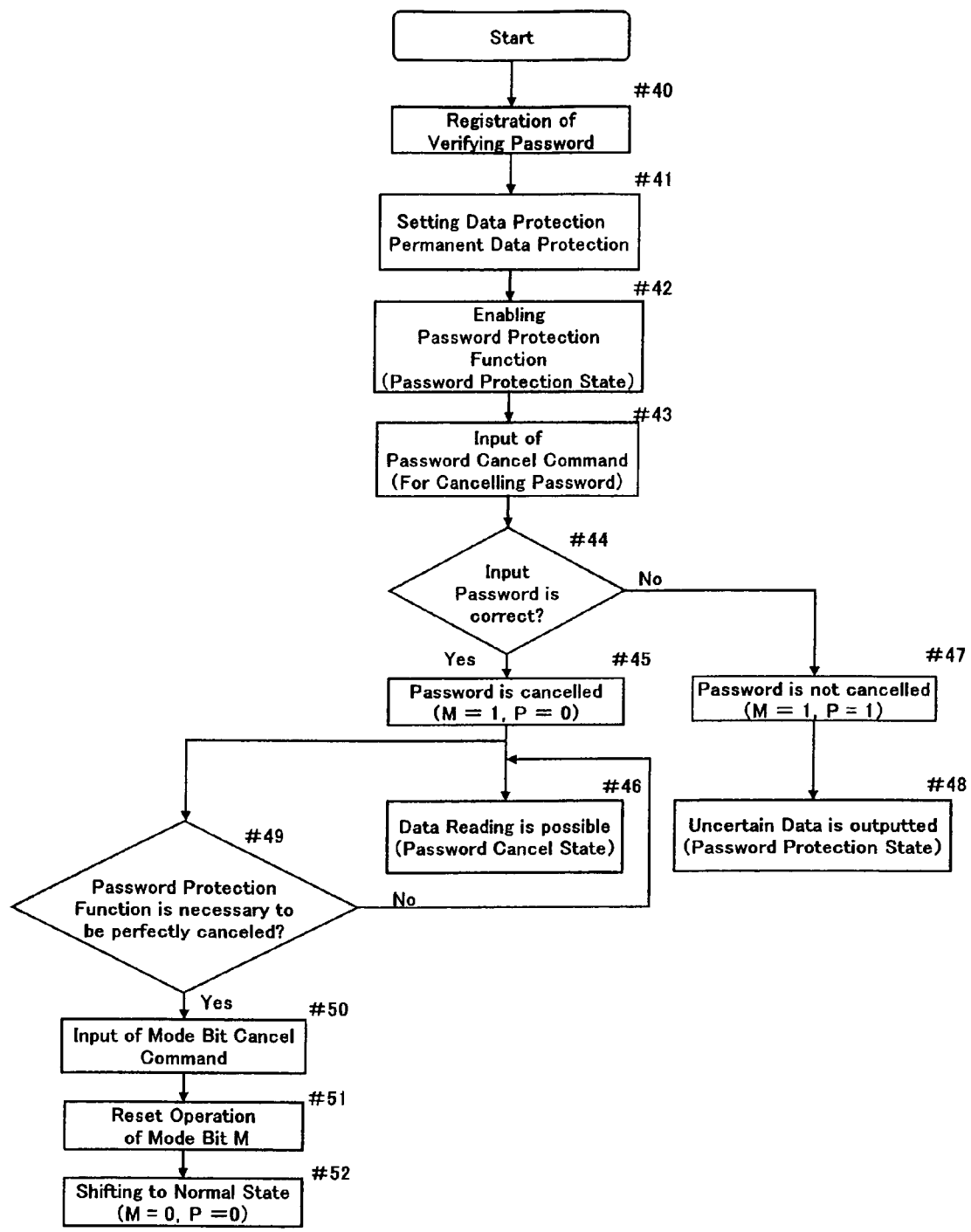
FIG. 6 is a flowchart showing steps of enabling or disabling the password protection function in the nonvolatile semiconductor memory device according to one embodiment of the present invention.

Next, a description will be made of processing steps when the user enables the password protection function and processing steps in the memory device of the present invention when the user disables it with reference to a flowchart shown in FIG. 6.

After the power supply is turned on, the verifying password is registered at step #40. Detailed steps in registering the password at the step #40 will be described below with reference to FIG. 7. After the verifying password is registered, it is determined whether already written data in memory block is protected from writing and erasing, or permanently protected, or not protected with respect to each memory block and a command to implement the protection corresponding to the usage of the memory block is executed with respect to each memory block at step #41. In addition, when writing of data is not completed before the password is registered at the step #40, after the data is written, the data is protected at the step #41. In addition, the data protection selected and executed at the step #41 is the same processes as the processing steps #12, #13, #18, #21 and the like shown in FIG. 4. When this process is executed before the password registration at the step #40, the step #41 can be omitted. At the step #41, the command for setting the permanent data protection flag of the memory block to the set state is executed to implement the permanent data protection for the memory block allotted to the boot-block to store the system program, for example.

Then, both of the mode bit M and protection bit P are set to the set state using the password protection enabling command at step #42, to enable the password protection function. More specifically, when the password protection enabling command is executed, the write operation to the nonvolatile mode bit memory circuit 6 storing the mode bit M is started and the mode bit M is changed from the reset state to the set state. Then, when the writing in the mode bit memory circuit 6 is completed, the mode bit M in the set state is automatically copied to the volatile protection bit memory circuit 7 and the protection bit P in the protection bit memory circuit 7 is set to the set state, so that the protection state of the memory device 20 of the present invention is shifted to the password protection state.

When the mode bit M is changed from the reset state to the set state, the protection bit P is changed from the reset state to the set state accordingly, and it also follows the state of the mode bit M at the time of the reset operation of the memory device 20 of the present invention. Thus, although the protection bit P seems to be subordinate to the mode bit M, when the mode bit M is in the set state, the protection bit P can be set to the reset state independently, so that the password protection function can be enabled or disabled according to the state of the protection bit P.

Since in the password protection state, the data cannot be read from the memory block in which the permanent data protection flag is in the reset state, when the data has to be read, it is necessary to cancel the password protection state and to temporally shift the state to the password cancel state. Thus, the password cancel command containing the correct password is inputted to the command interface 10 at step #43 to execute the password cancel operation.

The command interface 10 decodes the password cancel command and recognizes the instruction of the password cancel operation, and extracts the password from the password cancel command and it is compared with the verifying password registered at the step #40 by the comparator 8 at step #44.

When the password is correct in the result at the step #44 (YES), the password cancel operation is actually executed and the protection bit P is reset from the set state to the reset state and the protection state of the memory device 20 of the present invention is shifted from the password protection state to the password cancel state at step #45. However, the mode bit M is kept in the set state and the password protection function is only temporally canceled. When the state is shifted to the password cancel state, the data can be read from the memory block regardless of the state of the permanent data protection flag at step #46.

In addition, when the inputted password is not correct in the verified result at the step #44 (NO), the password cancel operation is not executed and the protection bit P is kept in the set state and the protection state of the memory device 20 of the present invention is not changed from the password protection state at step #47. In this case, when the data is read out from the memory block in which the permanent data protection flag is in the reset state, uncertain data is outputted at step #48. However, the data can be read out from the memory block in which the permanent data protection flag is in the set state. Therefore, the system program is to be stored in the memory block in which the permanent data protection flag is in the set state and personal data to be secured by password protection or data to be prevented from being leaked is to be stored in another memory block.

In addition, after the protection state is shifted to the password protection state at the step #42, when it is necessary to read the data from the memory block in which the permanent data protection flag is in the reset state, it is necessary to cancel the password protection state as described above. In this case, when the protection state of the memory device 20 of the present invention is not known, the ReadID command is inputted to the command interface 10 to read the state of the protection bit P. When the protection bit P is in the set state, the password protection state can be confirmed.

Then, after the protection state of the memory device 20 of the present invention is shifted from the password protection state to the password cancel state by the password cancel operation at the step #45, it is determined whether it is necessary to return the protection state to the normal state or not at step #49. When it is (YES), the mode bit cancel command is inputted to the command interface 10 at step #50, and the memory device 20 of the present invention resets the mode bit M from the set state to the reset state at step #51. More specifically, the command interface 10 decodes the mode bit cancel command and recognizes the reset operation of the mode bit M and outputs a control signal for erasing operation in the nonvolatile mode bit memory circuit 6 to the write state machine 11. When the write state machine 11 executes the erasing operation in the mode bit memory circuit 6 by the control signal for the erasing operation, the mode bit M is reset from the set state to the reset state and the protection state is shifted to the normal state at step #52.

In addition, in a case where the password cancel operation is not performed at the step #45 and the password protection state is maintained, even when the mode bit cancel command is inputted to the command interface 10, since the protection bit P is in the set state, the mode bit cancel command is not accepted and the mode bit M and the protection bit P are still in the set state, so that the password protection state is maintained.

Next, a description will be made of steps of registering the verifying password at the step #40 in FIG. 6 with reference to FIG. 7. In addition, the verifying password may be registered before or after the data is written in the memory block. It is assumed that the protection state of the memory device 20 of the present invention is the normal state in the following description.

After the power supply of the memory device 20 the present invention is turned on at step #60, the normal state is maintained in the memory device 20 of the present invention, so that the verifying password can be registered. Here, it is determined whether the verifying password is to be registered or not at step #61. When it is (YES), the password registration command is outputted at step #62. When the number of bits of the password is great, the password is divided. In a case where the password comprises 16 bits or more, the command is sequentially inputted several times. Then, a password registration command is executed, the verifying password is written in the password memory circuit 4 and it is automatically transferred to the volatile password register 5 and stored therein at step #63. Thus, the verifying password has been registered.

Meanwhile, when it is not necessary to register the verifying password (NO) at the step #61, the process is completed without registering the verifying password at step #64. In this case, since the password memory circuit 4 is not changed, that is, it is still in the erased state, values of the password are default values (which are all "0" or all "1", for example) in its erased state. Therefore, even when the password is not registered by the password registration command, the state is equivalent to a state when the password registration command is outputted and the verifying password which are all "0" or all "1" is inputted. It is to be noted that once the password protection function is enabled, the password protection function cannot be canceled without inputting the password whose values are all "0" or all "1". Furthermore, it is also to be noted that even when the password registration command is outputted at the step #62 and a verifying password which is neither all "0" nor "1" is registered in a regular manner, the protection state of the memory device 20 of the present invention is still the normal state, and another process step is needed to enable the password protection function.

Figure 7:
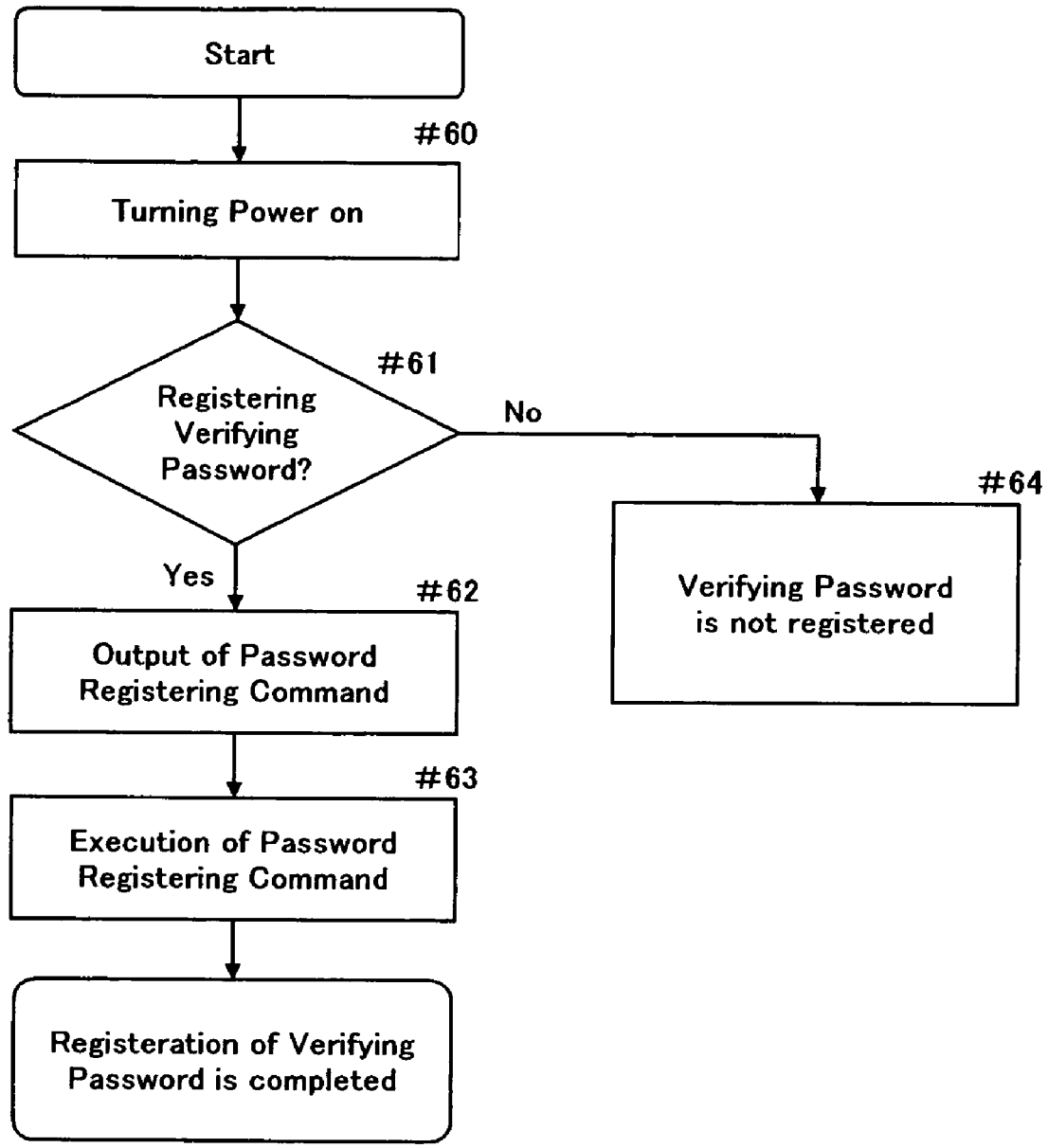
FIG. 7 is a flowchart showing steps of registering a verifying password used in the password protection function in the nonvolatile semiconductor memory device according to one embodiment of the present invention.

Although a description has been made of the case the protection state of the memory device 20 of the present invention is the normal state in the registering steps of the verifying password shown in FIG. 7, when the protection state is the password cancel state, the operations after the step #61 are directly to be performed without resetting the power supply or the hardware in the memory device 20 of the present invention to register the verifying password. In addition, when the protection state is the password protection state, it is necessary to cancel the password protection state once to shift the state to the password cancel state.

Figure 8:
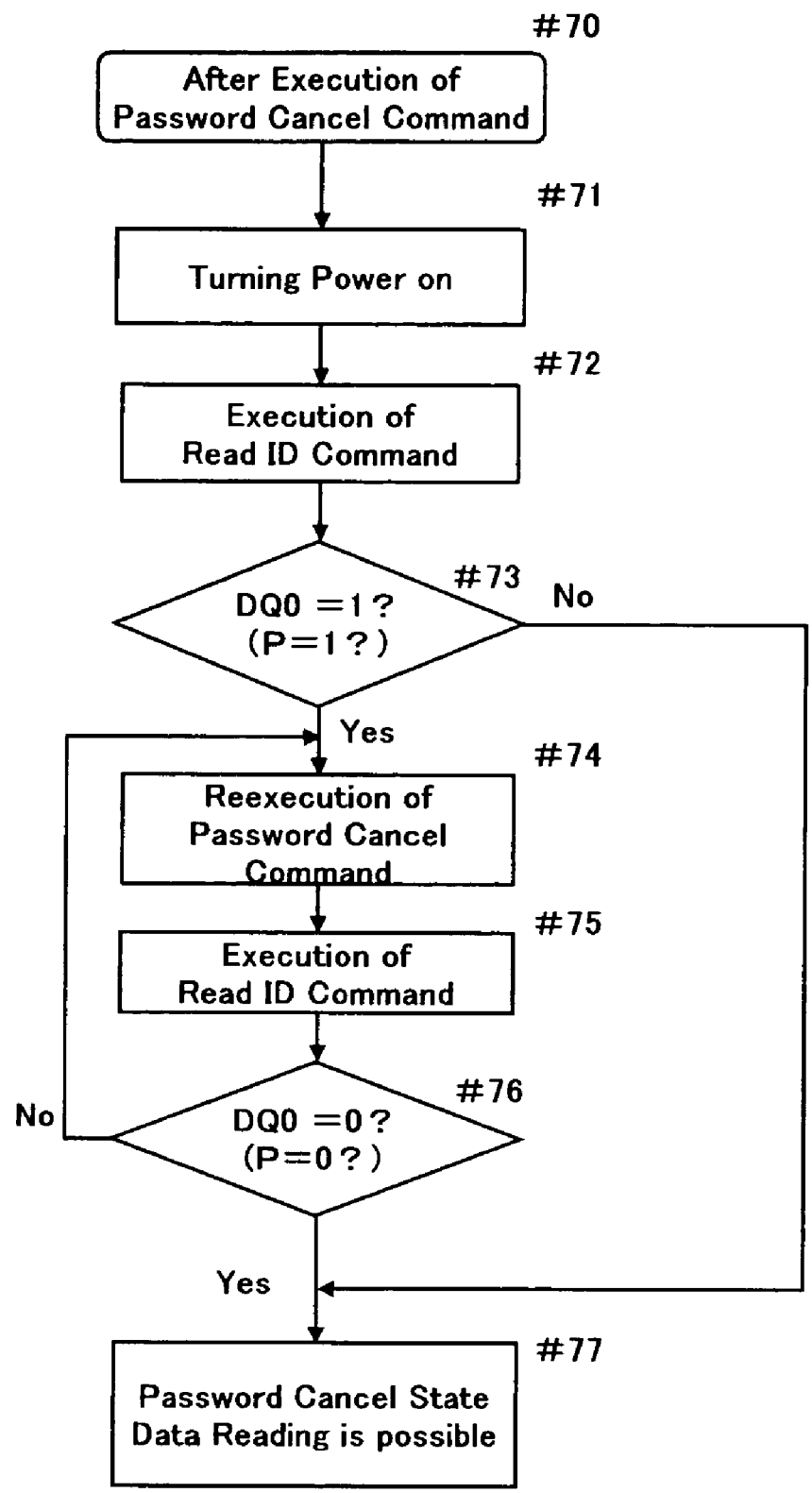
FIG. 8 is a flowchart showing steps of confirming a password cancel operation using a ReadID command in the nonvolatile semiconductor memory device according to one embodiment of the present invention.

Next, a description will be made of reading the internal state of the memory device 20 of the present invention using the ReadID command. FIG. 8 shows an example in which the ReadID command is used, that is, shows processing steps of receiving the password normally for the password cancel operation, executing the password cancel operation and confirming whether the state is shifted from the password protection state to the password cancel state or not.

In general, the nonvolatile semiconductor memory device represented by a flash memory has data specific to the device (device ID and ID code called device code) and when the ReadID command is inputted and executed, the data specific to the device is read and the device can be identified even after packaged or shipment. With a device identification function using the ReadID command it can be confirmed whether the password is inputted normally and whether the password cancel operation is executed or not. That is, when state value of each bit of the protection bit P and the mode bit M are allotted to a part of the bits of the ID code (lower 2 bits DQ0 and DQ1, for example), the state of the protection bit P and the mode bit M can be determined from the DQ0 and DQ1 in the ID code read out by inputting the ReadID command, so that it can be recognized whether the password is correctly inputted or not. When the protection P is in the reset state, it means that the password cancel operation is normally executed, so that it can be recognized that the password is normally inputted.

In addition, according to this embodiment, there is no means for directly reading out the verifying password from the password memory circuit 4. This is because the security level of the memory device 20 of the present invention is ensured by functionally excluding illegal password readout by a malicious third person in advance.

The steps will be described with reference to FIG. 8 hereinafter. The state after the password cancel command is executed is set as a starting point at step #70. Then, the power supply is reset by turning on the power supply of the memory device 20 of the present invention at step #71. When the power supply is normally reset, the protection state is shifted from the password cancel state to the password protection state and the protection bit P is changed from the reset state to the set state according to the mode bit M in the set state. Since the above confirming step is performed assuming that the password cancel state after the password cancel command is executed, returns to the password protection state by the power supply reset, this step is not indispensable.

Then, the mode bit M and the protection bit P are read by the ReadID command at step #72, and it is confirmed whether the protection bit P is normally set in the set state or not at step #73. When it is normally set (YES), the password cancel command is executed again at step #74. Then, the ReadID command is inputted at step #75, and it is confirmed whether the protection bit P is normally reset or not by reading out the ID code at step #76. When the protection bit P is in the reset state (YES), it means that the protection state is shifted to the password cancel state, so that the data can be read out from all memory blocks at step #77.

When the password cancel command is executed again at the step #74, if the password is not correct, since the protection bit P is in the set state (NO) at the time of confirming the protection bit P at the step #76, the operation returns to the step #74 and the password cancel command is executed again.

Meanwhile, when the power supply reset is not executed at the step #71, since the protection bit P is in the reset state (NO) at the time of confirming the protection bit P at the step #73, the protection state is directly shifted to the password cancel state at step #77 in some cases. Furthermore, when there is a defect in function to return from the password cancel state to the password protection state at the time of the power supply reset of the memory device 20 of the present invention, since the protection bit P is in the reset state in confirming the state at the step #73 also, the defect can be detected.

Figure 9:
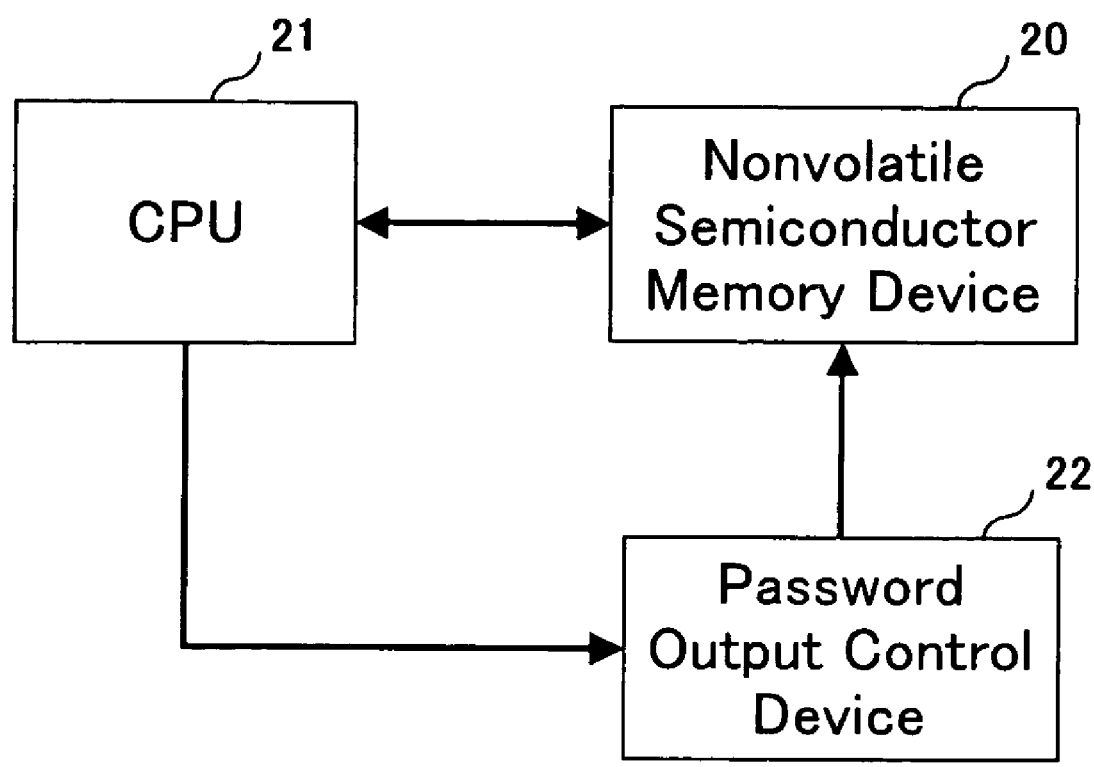
FIG. 9 is a block diagram showing an example of a system constitution using the nonvolatile semiconductor memory device according to the present invention.

FIG. 9 shows a system constitution example including the memory device 20 of the present invention. The system including the memory device 20 of the present invention comprises at least the memory device 20 of the present invention, a CPU 21, and a password output control device 22. The CPU 21 manages and controls an operation of the entire system, and when the power of the system is turned on, it loads a system program from a predetermined memory block in the memory device 20 of the present invention in which the system program is stored in advance. The loading of the system program is an operation called booting, and the memory block of the memory device 20 accessed by the CPU 21 first is called a boot-block.

Since the password protection function in the memory device 20 of the invention is enabled in the system shown in FIG. 9, the correct data cannot be read out from the memory device 20 of the present invention only by the access of the CPU 21 normally, so that the system does not work normally. Although the CPU 21 has to input the same password as the verifying password registered in the memory device 20 of the present invention at the time of board mounting previously to cancel the password protection function, if information regarding the password is written in the boot-block of the memory device 20 of the present invention, password protection becomes meaningless. Thus, when a system taking charge of that operation is constituted in the password output control device 22 which is another control circuit, even if the password is to be found out, the password cannot be found out only by focusing on the memory device 20 of the present invention. As a more concrete example, the password output control device 22 comprises a nonvolatile memory circuit in which password data having 32 bits or more can be stored, and when the password cancel command from the CPU 21 is executed, the registered password is sequentially outputted to the memory device 20 of the present invention in synchronization with a predetermined timing. Thus, the memory device 20 of the present invention receives the password from the CPU 21 and the memory device 20 of the present invention compares the inputted password from the password output control device 22 with the verifying password stored in the password register 5 in the memory device 20 of the present invention and only when both coincide with each other, the protection bit P is reset internally. As a result, the CPU 21 can read desired data from a certain memory block of the memory device 20 of the present invention.

Next, another embodiment of the memory device of the present invention will be described.

According to the above embodiment, although the memory device 20 of the present invention comprises the nonvolatile first flag memory circuit 2 which stores the data protection flag and the second flag memory circuit 3 which stores the permanent data protection flag to protect the written data from writing and erasing in each memory block, the memory device 20 of the present invention may not provide the data protection function against writing and erasing. In addition, a part of the plurality of memory blocks may comprise the data protection function.

Although all of the plurality of memory blocks can be protected from data readout by the password protection function in the above embodiment, a part of the memory blocks to be used as the boot-block may not comprise the password protection function in advance.

Furthermore, although a description has been made assuming that the plurality of memory blocks are provided in the above embodiment, the password protection function of the memory device of the present invention can be applied to a case where a device comprises a single memory block.

The nonvolatile semiconductor memory device according to the present invention can be applied to a nonvolatile semiconductor memory device such as a flash memory and especially applied to security measures against illegal readout of written data.

What is claimed is:

1. A nonvolatile semiconductor memory device comprising:
    at least one memory block made of a plurality of nonvolatile memory cells; and
    a password protection function in which data cannot be read out from a part of the memory block or the entire memory block without a cancel operation using a password, wherein
    the password protection function is enabled or disabled based on a first and second state specified values such that when both of the first and second state specified values are in a set state, the password protection function is enabled and when at least the second specified value is in a reset state, the password protection function is disabled, and
    the first state specified value maintains a previous state and the second state specified value follows the state of the first state specified value in response to a predetermined operation of the nonvolatile semiconductor memory device, and
    the cancel operation to shift the second state specified value to the reset state can be performed only when the password is inputted correctly.

2. The nonvolatile semiconductor memory device according to claim 1, wherein the predetermined operation is a reset operation at the time of turning on a power supply or inputting a reset signal.

3. The nonvolatile semiconductor memory device according to claim 1, wherein the second state specified value is changed to the set state following the first state specified value when the first state specified value is changed from the reset state to the set state.

4. The nonvolatile semiconductor memory device according to claim 1 further comprising:
    a nonvolatile first state specified value memory circuit in which the first state specified value is stored; and
    a volatile second state specified value memory circuit in which the second state specified value is stored.

5. The nonvolatile semiconductor memory device according to claim 1 further comprising:
    a nonvolatile password memory circuit in which a verifying password for the password is previously stored; and
    a volatile password register in which the verifying password transferred from the password memory circuit is stored after the power supply is turned on.

6. The nonvolatile semiconductor memory device according to claim 1, wherein
    a state specified by the first state specified value and the second state specified value comprises
    a password protection state in which both of the first state specified value and the second state specified value are in the set state so that the password protection function is enabled,
    a password cancel state in which the first state specified value is in the set state and the second state specified value is in the reset state, and
    a normal state when both of the first state specified value and the second state specified value are in the reset state, and
    the state can be shifted from the normal state to the password protection state, from the password protection state to the password cancel state, and from the password cancel state to the password protection state or the normal state.

7. The nonvolatile semiconductor memory device according to claim 6, wherein the normal state is set as an initial state before shipment.

8. The nonvolatile semiconductor memory device according to claim 6, wherein both of the first state specified value and the second state specified value are changed from the reset state to the set state when a predetermined password protection enabling command for shifting the normal state to the password protection state is inputted in the normal state.

9. The nonvolatile semiconductor memory device according to claim 6, wherein the normal state is maintained when a command other than the password protection enabling command is inputted in the normal state, a power supply reset occurs, or a reset signal is inputted.

10. The nonvolatile semiconductor memory device according to claim 6, wherein the second state specified value is reset from the set state to the reset state when a predetermined password cancel command for shifting the password protection state to the password cancel state is inputted in the password protection state.

11. The nonvolatile semiconductor memory device according to claim 10, wherein the password cancel command comprises a plurality of bits and contains the password therein.

12. The nonvolatile semiconductor memory device according to claim 11, wherein the second state specified value is reset from the set state to the reset state and the state is shifted to the password cancel state when the password cancel command is inputted in the password protection state and the password contained in the password cancel command coincides with the predetermined verifying password.

13. The nonvolatile semiconductor memory device according to claim 12, wherein the second state specified value is not reset from the set state to the reset state and the password protection state is maintained when the password cancel command is inputted in the password protection state and the password contained in the password cancel command does not coincide with the predetermined verifying password.

14. The nonvolatile semiconductor memory device according to claim 10, wherein the second state specified value is not reset from the set state to the reset state and the password protection state is maintained when the command other than the password cancel command is inputted in the password protection state, the power supply reset occurs, or the reset signal is inputted.

15. The nonvolatile semiconductor memory device according to claim 6, wherein the first state specified value is changed from the reset state to the set state when the predetermined protection cancel command for shifting the password cancel state to the normal state is inputted.

16. The nonvolatile semiconductor memory device according to claim 6, wherein the second state specified value is changed from the reset state to the set state and the state is shifted to the password protection state when the power supply reset occurs or the reset signal is inputted in the password cancel state.

17. The nonvolatile semiconductor memory device according to claim 1 further comprising:
   a first nonvolatile flag memory circuit in which a data protection flag for inhibiting writing and erasing to and from the memory block in units of the memory block is stored; and
   a second nonvolatile flag memory circuit in which a permanent data protection flag for permanently inhibiting writing and erasing to and from the memory block in units of the memory block is stored, wherein
   data stored in the memory block for which the permanent data protection flag is set is permanently protected from writing and erasing and can be read out regardless of the state of the data protection flag.

18. The nonvolatile semiconductor memory device according to claim 17, wherein data can be read out from only the memory block for which the permanent data protection flag is set when the password protection function is enabled.

19. The nonvolatile semiconductor memory device according to claim 18, wherein a setting operation of the permanent data protection flag can be only performed when at least the second state specified value is in the reset state.

20. The nonvolatile semiconductor memory device according to claim 18, wherein the permanent data protection flag is set for one memory bock selected as a boot-block in the memory blocks.

* * * * *